US010781861B2

United States Patent
Nakamura

(10) Patent No.: US 10,781,861 B2
(45) Date of Patent: Sep. 22, 2020

(54) PROTECTIVE COVER HAVING SENSOR HOLDER PART, BEARING DEVICE INCLUDING THE PROTECTIVE COVER, AND METHOD FOR MANUFACTURING THE PROTECTIVE COVER HAVING THE SENSOR HOLDER PART

(71) Applicant: NAKANISHI METAL WORKS CO., LTD., Osaka-shi (JP)

(72) Inventor: Masayoshi Nakamura, Osaka (JP)

(73) Assignee: NAKANISHI METAL WORKS CO., LTD., Osaka-shi (JP)

( * ) Notice: Subject to any disclaimer, the term of this patent is extended or adjusted under 35 U.S.C. 154(b) by 0 days.

(21) Appl. No.: 16/364,931

(22) Filed: Mar. 26, 2019

(65) Prior Publication Data
US 2019/0301534 A1  Oct. 3, 2019

(30) Foreign Application Priority Data
Mar. 28, 2018  (JP) .................. 2018-061075

(51) Int. Cl.
*F16C 19/18*  (2006.01)
*F16C 33/72*  (2006.01)
(Continued)

(52) U.S. Cl.
CPC .......... *F16C 33/723* (2013.01); *B29C 45/561* (2013.01); *B60B 27/0068* (2013.01);
(Continued)

(58) Field of Classification Search
CPC .... F16C 19/186; F16C 19/187; F16C 33/723; F16C 33/786; F16C 33/7833;
(Continued)

(56) References Cited

U.S. PATENT DOCUMENTS 9,505,267 B2* 11/2016 Gemello ............... F16C 33/723
2016/0187764 A1* 6/2016 Tobita ............. B29D 11/00413
359/511
(Continued)

FOREIGN PATENT DOCUMENTS

DE   102012204039 A1 * 9/2013 ............ F16C 33/723
EP         487752 A1 * 6/2016 ............ B29C 45/26
(Continued)

*Primary Examiner* — Marcus Charles
(74) *Attorney, Agent, or Firm* — Kratz, Quintos & Hanson, LLP

(57) ABSTRACT

A protective cover includes: a synthetic resin disc part having formed therein a separation wall which is thinner than other parts of the disc part and separates a magnetic encoder and a magnetic sensor from each other; and a synthetic resin sensor holder part protruding inward from the disc part. A gate mark caused by the injection molding is present n an outer peripheral surface of the disc part or an outer peripheral surface of a cylindrical part continuous with the disc part, in the radially outer side of the separation wall. Since the gate is at the radially outer side, of the separation wall, which is near the separation wall, no charging end weld is generated on the separation wall when a molten synthetic resin material is injected from the gate into the cavity of the injection mold die and solidified in an injection molding step.

4 Claims, 8 Drawing Sheets

(51) Int. Cl.
*F16C 33/76* (2006.01)
*B60B 27/00* (2006.01)
*B29C 45/56* (2006.01)
*F16C 41/00* (2006.01)
B29C 45/00 (2006.01)

(52) U.S. Cl.
CPC .......... *F16C 19/186* (2013.01); *F16C 19/187* (2013.01); *F16C 33/768* (2013.01); *F16C 41/007* (2013.01); *B29C 2045/0027* (2013.01); *B29C 2045/0034* (2013.01); *F16C 2220/04* (2013.01); *F16C 2326/02* (2013.01)

(58) Field of Classification Search
CPC ................ F16C 41/007; F16C 2220/04; F16C 2326/02; B60B 27/001; B60B 27/0068; B60B 27/0094; B29C 2045/0027; B29C 2045/0034; B29C 45/561
USPC .......................... 384/448, 489, 544, 569, 513
See application file for complete search history.

(56) References Cited

U.S. PATENT DOCUMENTS

| 2017/0001471 A1* | 1/2017 | Fukuda | F16C 33/7886 |
| 2017/0009813 A1* | 1/2017 | Takanashi | F16C 33/723 |

FOREIGN PATENT DOCUMENTS

| JP | 2002137254 A * | 5/2002 | ............ B29C 33/78 |
| JP | 2004-354066 A | 12/2004 | |
| JP | 2017-15246 A | 1/2017 | |
| WO | WO-2018003255 A1 * | 1/2018 | ............ F16C 33/76 |

* cited by examiner

PROTECTIVE COVER HAVING SENSOR HOLDER PART, BEARING DEVICE INCLUDING THE PROTECTIVE COVER, AND METHOD FOR MANUFACTURING THE PROTECTIVE COVER HAVING THE SENSOR HOLDER PART

BACKGROUND OF THE INVENTION

Field of the Invention

The present invention relates to a cup-shaped protective cover which is mounted to an outer ring of a bearing so as to cover a magnetic encoder, and relates, in particular, to a protective cover having a sensor holder part which holds a magnetic sensor opposed to the magnetic encoder.

Description of the Background Art

In anti-lock brake systems widely used in automobiles for providing efficient and safe braking through prevention of locking of wheels, the rotation speed of each wheel is detected by a rotation speed detection device (wheel speed sensor), the acceleration and the deceleration are calculated by a control device, the vehicle body speed and the slip ratio are estimated, and on the basis of the result, an actuator is driven to control the brake fluid pressure, for example.

Bearing devices each including such a rotation speed detection device provided at a rolling bearing (hub bearing) for supporting a wheel of an automobile are also widely used. In such a bearing device, a magnetic encoder in which N poles and S poles are alternately arranged at regular intervals in the circumferential direction is mounted to an inner ring at one end portion in the axial direction of the bearing, and a protective cover is mounted to an outer ring at the one end portion in the axial direction of the bearing so as to seal the bearing (see Patent Literature 1, for example).

In Patent Literature 1, a protective cover (1) is made of a synthetic resin and has a capped-cylindrical shape. The protective cover (1) is provided with a sensor holder part (3B) which protrudes inward from a disc part (main body part 3A) and holds a magnetic sensor (A) for detecting rotation of a magnetic encoder (16).

In the state where the protective cover of the invention described in Patent Literature 1 is used, the magnetic sensor (A) is opposed to the magnetic encoder (16), with a thin separation wall (B) formed integrally with the protective cover (1) interposed therebetween.

When such a protective cover (1) having the separation wall (B) is used, it is not necessary, unlike a protective cover not having the separation wall but having a sensor mounting hole penetrating a disc part in the thickness direction thereof, to incorporate a rubber sealing member such as an O-ring between the magnetic sensor and a wall face in which a sensor mounting hole is formed.

Since the bearing device is provided with the protective cover having the separation wall as in Patent Literature 1, the one end portion in the axial direction of the bearing is sealed and thus, pebbles, muddy water, and the like do not collide with the magnetic encoder. Thus, breakage of the magnetic encoder can be prevented. Since no sealing member around the magnetic encoder is required, sliding resistance is reduced, and thus, the running torque of the bearing device can be reduced. In addition, the trouble of adjusting the air gap between the magnetic encoder and the magnetic sensor can be eliminated.

CITATION LIST

Patent Literature

[PTL 1] Japanese Unexamined Patent Application Publication No. 2004-354066
[PTL 2] Japanese Unexamined Patent Application Publication No. 2017-015246

The protective cover having the sensor holder part as in the invention described in Patent Literature 1 has the features described above.

Here, the separation wall is set to be as thin as about 0.3 to 0.8 mm, from the viewpoint of improving the detection accuracy of the magnetic sensor. Thus, the relative difference between the thickness of the main body part and the thickness of the separation wall is large. In addition, the protective cover is molded from a fiber-reinforced resin such as a glass-fiber-reinforced polyamide resin in many cases. Accordingly, during injection molding, when the molten synthetic resin material is charged from a molding space for forming the main body part, into a molding space for forming the separation wall, the molten synthetic resin material is lastly charged into a part of the separation wall of the molded article (charging end), and a merging portion of the molten synthetic resin material from the surroundings (weld) is generated on a part of the separation wall. Therefore, when the main body part and the separation wall are molded integrally with each other, a charging end weld is generated on a part of the separation wall.

In order to prevent generation of a charging end weld on a part of the thin separation wall, the protective cover (1) of Patent Literature 2 is provided with a thick part (6) having a substantially fan shape of which the width dimension gradually increases from a position (F) corresponding to a pin gate (see FIG. 5 of Patent Literature 2) located at the center (O) of a disc part (main body part 3A), toward a position corresponding to a sensor holder part (3B) including a separation wall (B), for example (see FIG. 2, FIG. 3(a), and FIG. 3(b) of Patent Literature 2).

The disc part (main body part 3A) of the protective cover (1) has the thick part (6), thereby preferentially charging the molten synthetic resin material (P) into a thin part (4) where the separation wall (B) is to be formed in a cavity (C) of the injection mold die. Accordingly, the charging end weld is not generated on the thin separation wall (B), and thus, reduction in air tightness of the thin separation wall (B) and in strength thereof can be prevented.

However, the protective cover (1) having the sensor holder part of the invention described in Patent Literature 2 has a restriction of preventing the thick part (6) having the above-described shape from interfering with another component. Thus, the thick part (6) cannot be set to have a desired size in some cases. In such a case, the desired performance cannot be obtained. This reduces the degree of freedom in designing.

Although the protective cover (1) having the sensor holder part of the invention described in Patent Literature 2 has the features described above, there is room for improvement from the viewpoint of improving the degree of freedom in designing.

SUMMARY OF THE INVENTION

In view of the background described above, an object of the present invention is to improve the degree of freedom in designing while preventing reduction in air tightness and strength of the separation wall, in injection molding of a protective cover having a thin separation wall in a disc part.

In order to solve the above problem, a protective cover having a sensor holder part according to the present invention is a protective cover having a sensor holder part, having a cup shape, and configured to be used in a bearing device, the bearing device including:

a bearing including: an inner ring having, on an outer peripheral surface thereof, an inner ring raceway surface: an outer ring having, on an inner peripheral surface thereof, an outer ring raceway surface; and a rolling element rolling between the inner ring raceway surface and the outer ring raceway surface;

a magnetic encoder including N poles and S poles, which are alternately arranged at regular intervals in a circumferential direction, the magnetic encoder being located at an inward-side end portion of the bearing and fixed to the inner ring; and a magnetic sensor being opposed to magnetic poles of the magnetic encoder, for detecting rotation of the magnetic encoder, the protective cover being configured to be mounted to the outer ring so as to seal the inward-side end portion of the bearing, the protective cover comprising:

a disc part that is made of a synthetic resin and has a separation wall formed therein, the separation wall being thinner than other portions of the disc part, and separating the magnetic encoder and the magnetic sensor from each other; and the sensor holder part made of the synthetic resin and protruding inward from the disc part, the protective cover being molded through injection molding of the synthetic resin, wherein a gate mark caused by the injection molding is present on an outer peripheral surface of the disc part or an outer peripheral surface of a cylindrical part continuous with the disc part, in a radially outer side of the separation wall (claim 1).

According to such configuration of the protective cover, the gate mark caused by the injection molding is present on the outer peripheral surface of the disc part or the outer peripheral surface of the cylindrical part continuous with the disc part, in the radially outer side of the separation wall which is thinner than the remainder.

Thus, the gate, through which the molten synthetic resin material is injected, of the injection mold die used in manufacturing the protective cover through injection molding is at a position corresponding to the outer peripheral surface of the disc part or a position corresponding to the outer peripheral surface of the cylindrical part continuous with the disc part, in the radially outer side of the separation wall. Since the gate is provided in the radially outer side, of the separation wall, which is near the separation wall being thinner than the remainder, no charging end weld is generated on the separation wall when the molten synthetic resin material is injected through the gate into the cavity of the injection mold die and solidified in the injection molding step.

Therefore, in the protective cover having the sensor holder part manufactured through the injection molding, reduction in air tightness and strength of the separation wall between the magnetic sensor and the magnetic encoder can be prevented.

In addition, since the protective cover does not have the thick part for preferentially charging the molten synthetic resin material into the thin part forming the separation wall, there is no restriction of preventing the thick part from interfering with another component, thereby improving the degree of freedom in designing the protective cover.

The bearing device according to the present invention includes the protective cover (claim 2).

In order to solve the above problem, a method for manufacturing a protective cover having a sensor holder part according to the present invention is a method for manufacturing, by use of an injection mold die, a protective cover having a sensor holder part, having a cup shape, and configured to be used in a bearing device, the bearing device including:

a bearing including: an inner ring having, on an outer peripheral surface thereof, an inner ring raceway surface: an outer ring having, on an inner peripheral surface thereof, an outer ring raceway surface; and a rolling element rolling between the inner ring raceway surface and the outer ring raceway surface;

a magnetic encoder including N poles and S poles, which are alternately arranged at regular intervals in a circumferential direction, the magnetic encoder being located at an inward-side end portion of the bearing and fixed to the inner ring; and a magnetic sensor being opposed to magnetic poles of the magnetic encoder, for detecting rotation of the magnetic encoder, the protective cover being configured to be mounted to the outer ring so as to seal the inward-side end portion of the bearing, the protective cover including:

a disc part that is made of a synthetic resin and has a separation wall formed therein, the separation wall being thinner than other portions of the disc part, and separating the magnetic encoder and the magnetic sensor from each other; and the sensor holder part made of the synthetic resin and protruding inward from the disc part, the injection mold die being configured to mold the protective cover and including a gate at a position corresponding to an outer peripheral surface of the disc part or a position corresponding to an outer peripheral surface of a cylindrical part continuous with the disc part, in a radially outer side of the separation wall, the method comprising:

closing the injection mold die, injecting a molten synthetic resin material from the gate into a cavity of the die, and solidifying the material, to perform injection molding; and opening the injection mold die and taking out a solidified molded article (claim 3).

According to such a manufacturing method, the gate, through which the molten synthetic resin material is injected, of the injection mold die is at a position corresponding to the outer peripheral surface of the disc part or a position corresponding to the outer peripheral surface of the cylindrical part continuous with the disc part, in the radially outer side of the separation wall. Since the gate is provided in the radially outer side, of the separation wall, which is near the separation wall being thinner than the remainder, no charging end weld is generated on the separation wall when the molten synthetic resin material is injected through the gate into the cavity of the injection mold die and solidified in the injection molding step.

Therefore, in the protective cover having the sensor holder part manufactured by this manufacturing method, reduction in air tightness and strength of the separation wall between the magnetic sensor and the magnetic encoder can be prevented.

In addition, since the protective cover does not have the thick part for preferentially charging the molten synthetic resin material into the thin part forming the separation wall, there is no restriction of preventing the thick part from interfering with another component, thereby improving the degree of freedom in designing the protective cover.

The gate may be a submarine gate (claim 4).

According to this configuration, when the injection mold die is opened and the molded article is pushed out, the gate is automatically cut. Therefore, there is no need to cut the gate in a later step, and thus, the manufacturing cost can be reduced.

According to the protective cover having the sensor holder part, the bearing device having the protective cover, and the method for manufacturing the protective cover having the sensor holder part of the present invention described above, the protective cover that does not have a through hole penetrating the sensor holder part in the thickness direction and that has a separation wall made of a synthetic resin between the magnetic sensor and the magnetic encoder mainly exhibits the effects indicated below.

(1) Reduction in air tightness and strength of the separation wall between the magnetic sensor and the magnetic encoder can be prevented.

(2) Since there is no thick part for preferentially charging the molten synthetic resin material into the thin part forming the separation wall, there is no restriction of preventing the thick part from interfering with another component, and thus, the degree of freedom in designing the protective cover can be improved.

DESCRIPTION OF THE PREFERRED EMBODIMENTS

Next, the present invention will be described in further detail with reference to the embodiment shown in the attached drawings.

Herein, the direction of the rotation axis of a bearing device A is referred to as "axial direction", and the direction orthogonal to the axial direction is referred to as "radial direction".

With respect to a bearing 11 and a protective cover 1, in a state where the protective cover 1 is attached to the bearing 11, the direction parallel to the axial direction and extending from the vehicle body of an automobile toward the wheel side is defined as "outward" (see the arrow C1 in FIG. 1, FIG. 4, FIG. 5, FIG. 8, and FIG. 9), and the direction opposite thereto is defined as "inward" (see the arrow C2 in FIG. 1, FIG. 4, FIG. 5, FIG. 8, and FIG. 9).

<Bearing Device>

Figure 1:
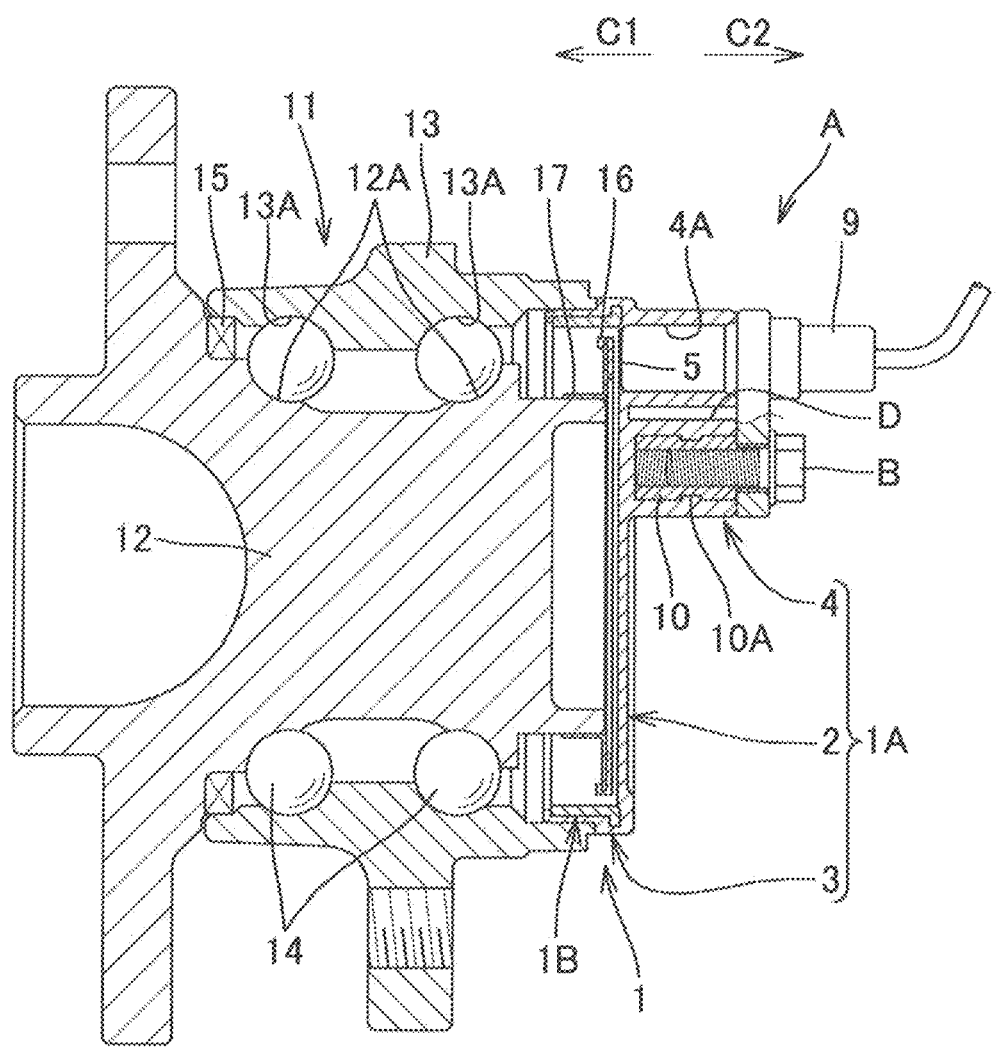
FIG. 1 is a vertical cross-sectional view of a bearing device provided with a protective cover having a sensor holder part according to an embodiment of the present invention.

As shown in a vertical cross-sectional view in FIG. 1, the bearing device A according to an embodiment of the present invention includes: the bearing 11 in which an inner ring 12 rotates with respect to an outer ring 13; a magnetic encoder 16; the protective cover 1; a magnetic sensor 9; a sealing member 15 disposed at an outward-side (see the arrow C1) end portion of the bearing 11; and so on.

The bearing 11 includes: the inner ring 12 having, on the outer peripheral surface thereof, an inner ring raceway surface 12A; the outer ring 13 having, on the inner peripheral surface thereof, an outer ring raceway surface 13A; rolling elements 14 which roll between the inner ring raceway surface 12A and the outer ring raceway surface 13A; and so on.

The magnetic encoder 16 includes N poles and S poles, which are alternately arranged at regular intervals in the circumferential direction. The magnetic encoder 16 is fixed to the inner ring 12 by a support member 17 located at an inward-side (see the arrow C2) end portion of the bearing 11.

The protective cover 1 has a cup shape, is mounted to the outer ring 13 so as to seal the inward-side end portion of the bearing 11, and has a sensor holder part 4 which holds the magnetic sensor 9.

The magnetic sensor 9 attached to the sensor holder part 4 of the protective cover 1 is opposed to the magnetic encoder 16 with a separation wall 5 having a thickness of, for example, about 0.3 to 0.8 mm interposed therebetween. The magnetic sensor 9 detects rotation of the magnetic encoder 16.

As seen from the vertical cross-sectional view in FIG. 1, a position of the magnetic encoder 16, which is detected by the magnetic sensor 9, is set to be at a radially outer position, thereby improving the detection accuracy of the rotation speed detection device.

Due to the protective cover 1, the magnetic sensor 9 is opposed to the magnetic encoder 16 with the separation wall 5 interposed therebetween. The protective cover 1 does not have a through hole penetrating the protective cover 1 in the thickness direction thereof. Thus, there is no need to incorporate a sealing member such as an O-ring.

In addition, the inward-side end portion of the bearing 11 is sealed by the protective cover 1, thereby preventing pebbles, muddy water, and the like from colliding with the magnetic encoder 16. This prevents the magnetic encoder 16 from being broken.

Further, the inward-side end portion of the bearing 11 is sealed by the protective cover 1, thereby eliminating the requirement of sealing member at the inward side of the magnetic encoder 16. This reduces the sliding resistance, thereby also reducing the running torque of the bearing 11.

Still further, the protective cover 1 is provided with the sensor holder part 4, thereby eliminating the trouble in adjusting the air gap between the magnetic encoder 16 and the magnetic sensor 9.

<Protective Cover>

Figure 2:
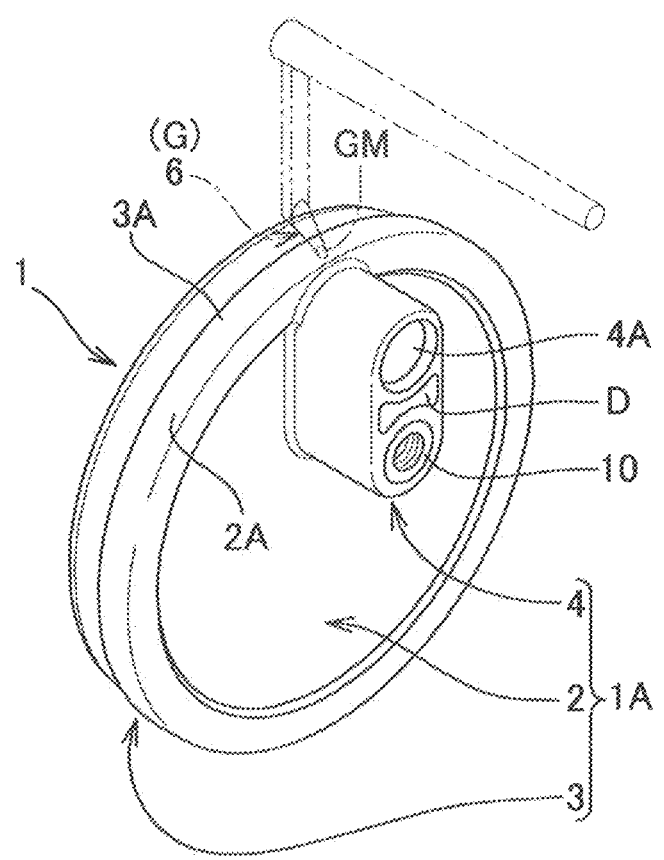
FIG. 2 is a perspective view of the protective cover having the sensor holder part according to the embodiment of the present invention.
Figure 3:
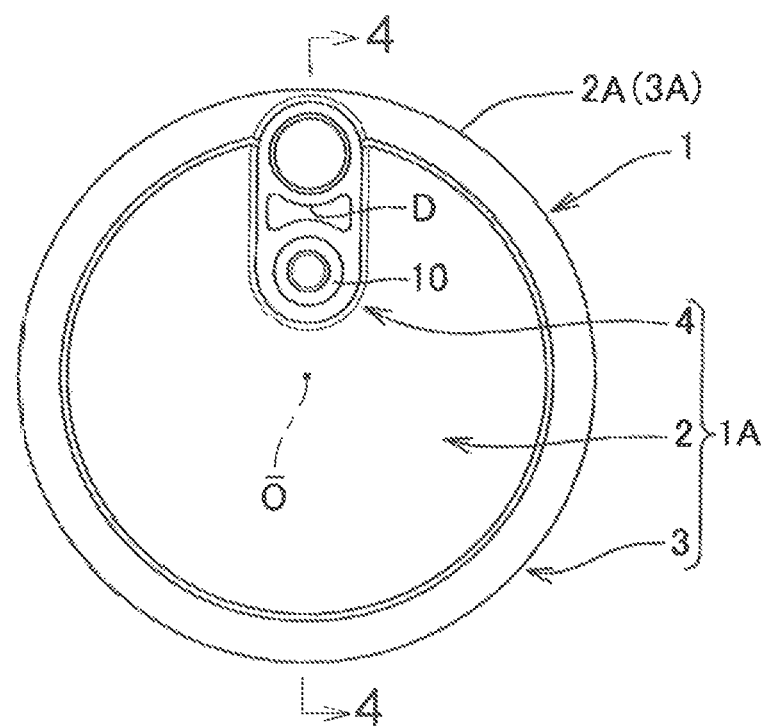
FIG. 3 is a view of the protective cover seen from the inward side.
Figure 4:
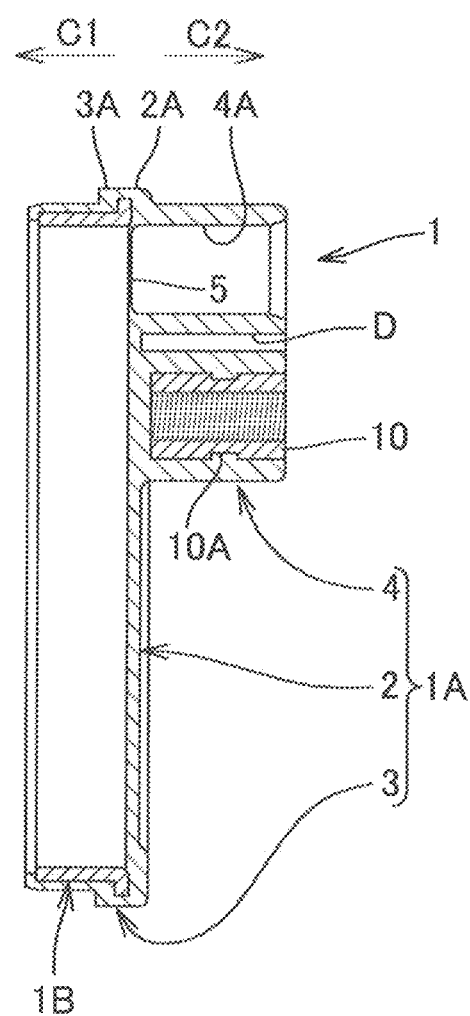
FIG. 4 is a cross-sectional view taken along arrows 4-4 in FIG. 3.

As shown in the vertical cross-sectional view in FIG. 1, a perspective view in FIG. 2, a view from the inward side in FIG. 3, and a cross-sectional view, in FIG. 4, taken along the arrows X-X in FIG. 3, the protective cover 1 according to the embodiment of the present invention includes: a fiber-reinforced synthetic resin main body 1A; and a metal annular body 1B, which are integrally formed through insert injection molding of a resin and a metal.

The fiber-reinforced synthetic resin for molding the main body 1A may include a synthetic resin, such as polyamide (nylon 6, nylon 66, nylon 612, or the like), polyphenylene sulfide (PPS), or polybutylene terephthalate (PBT), and 20 to 70% by weight of glass fiber contained in the synthetic resin, for example. The content of the glass fiber may also be 40 to 60° % by weight.

As the metal annular body 1B, a cold-rolled steel such as SPCC, which is a low carbon steel, may be used.

The main body 1A includes a disc part 2 and a cylindrical part 3 which form a cup shape, and the sensor holder part 4 which protrudes inward from the disc part 2.

The sensor holder part 4 holds a nut 10 that is, for example, made of brass, and is screwed with a mounting bolt B for mounting the magnetic sensor 9. The sensor holder part 4 has a sensor mounting hole 4A into which the magnetic sensor 9 is inserted. The sensor holder part 4 has, at the inward-side face thereof, a thickness reduction part D extending outward.

In the disc part 2, the separation wall 5 is formed which is thinner than other portions of the disc part 2. The separation wall 5 separates the magnetic encoder 16 and the magnetic sensor 9 from each other. As shown in FIG. 2, a gate mark GM caused by injection molding described later is on an outer peripheral surface 3A of the cylindrical part 3.

In a case where the gate of the injection mold die is located at an outer peripheral surface 2A of the disc part 2 in the radially outer side of the separation wall 5, the gate mark GM is present on the outer peripheral surface 2A of the disc part 2.

<Method for Manufacturing Protective Cover>

(Injection Mold Die)

Next, a method for manufacturing the protective cover 1 shown in FIG. 2 to FIG. 4 is described with reference to a vertical cross-sectional view of an injection mold die IM mainly shown in FIG. 5.

Figure 5:
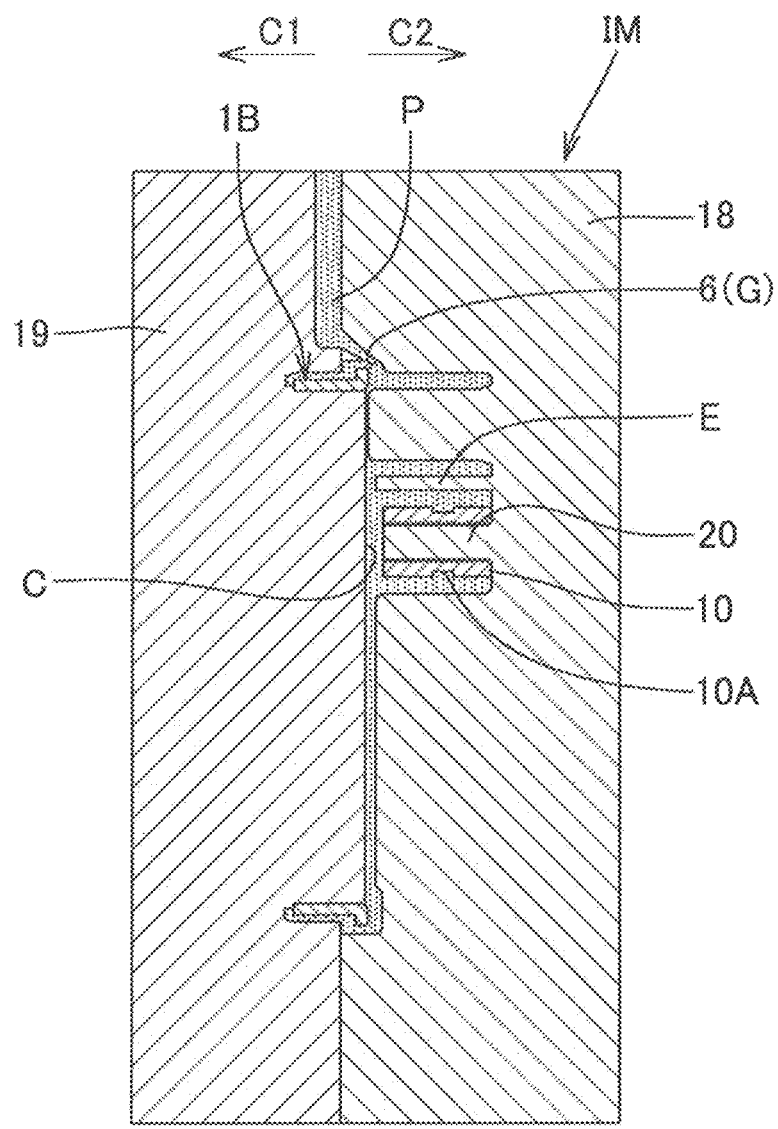
FIG. 5 is a vertical cross-sectional view which is taken along the arrows 4-4 in FIG. 3, shows an injection mold die for molding the protective cover having the sensor holder part according to the embodiment of the present invention, and also shows a submarine gate.

The vertical cross-sectional view in FIG. 5 corresponds to the cross-section taken along the arrows X-X in FIG. 3, and shows a state after a molten synthetic resin material P is injected into a cavity C of the injection mold die IM.

As shown in FIG. 4 and FIG. 5, the injection mold die IM includes a submarine gate 6, at a position corresponding to the outer peripheral surface 2A of the disc part 2, at the radially outer side of the separation wall 5. The submarine gate 6 is a gate G through which the molten synthetic resin material P is injected. The gate G may be located at the outer peripheral surface 3A of the cylindrical part 3 continuous with the disc part 2, at the radially outer side of the separation wall 5.

A fixed die 18 includes: a support shaft 20 for supporting the nut 10; and a columnar part E which protrudes outward (see the arrow C1) for providing the thickness reduction part D at the inward-side (see the arrow C2) face of the sensor holder part 4.

(Injection Molding Step)

First, before the molten synthetic resin material P is injected into the cavity C of the injection mold die IM shown in the vertical cross-sectional view in FIG. 5, the injection mold die IM is opened. Then, the nut 10 that is an insert article is set to the support shaft 20 of the fixed die 18, and the metal annular body 1B that is an insert article is set to a movable die 19, and then, the injection mold die IM mounted to the injection molding machine is clamped.

Next, as shown in the vertical cross-sectional view in FIG. 5, the molten synthetic resin material P is charged from the submarine gate 6 into the cavity C of the injection mold die IM.

(Molded Article Taking-Out Step)

Next, the molten synthetic resin material P is cooled and solidified, the movable die 19 is opened, and the injection molded article is taken out.

The gate mark GM shown in FIG. 2 remains in the protective cover 1 that is the injection molded article. The "gate mark" of the protective cover 1 includes a mark that remains after the gate mark has been removed through machine work or the like from the protective cover 1 having been taken out of the injection mold die IM.

In the protective cover 1 that is an insert molded article manufactured through the above-described insert injection molding, the synthetic resin enters a peripheral groove 10A of the nut 10, thereby preventing the nut 10 from coming off.

In addition, the cylindrical part 3 is present around the outward-side (see the arrow C1 in FIG. 4) end portion of the metal annular body 1B, thereby allowing the metal annular body 1B and the fiber-reinforced synthetic resin main body 1A to be mechanically coupled with each other.

<Resin Flow Analysis>

Resin flow analysis was performed by use of Simulation Moldflow, which is a simulation tool for plastic injection molding.

(Analysis Condition)

The material of the fiber-reinforced synthetic resin was PA 66 and 50% by weight of glass fiber that has been added to the PA 66. The injection flow rate was 70 mm$^3$ is. As the molding condition, the resin temperature was set to 300° C., and the die temperature was set to 95° C.

The diameter of the gate was set to 2 mm, and the thickness of the separation wall 5 was set to 0.3 mm.

EXAMPLE AND COMPARISON EXAMPLE

As for the protective cover 1 shown in FIG. 2 to FIG. 4, a protective cover 1 having the submarine gate 6 as the gate G as shown in FIG. 2 and FIG. 5 was used as Example, and a protective cover 1 having a pin gate disposed at the inward side at the center O of the disc part 2 as shown in FIG. 3 was used as Comparison Example.

(Analysis Result)

Figure 6:
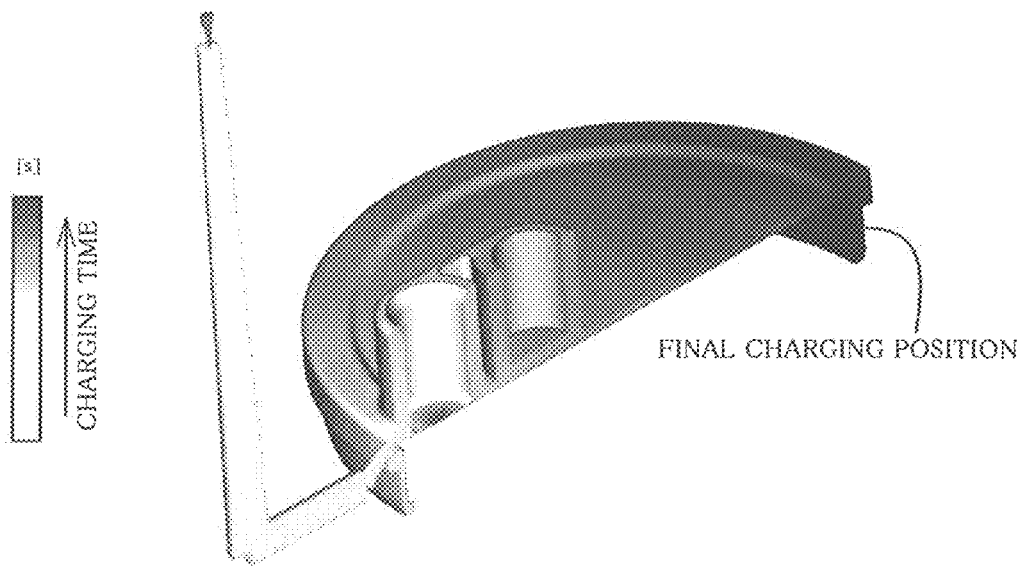
FIG. 6 is a contour diagram showing the charging time distribution of Example in resin flow analysis.
Figure 7:
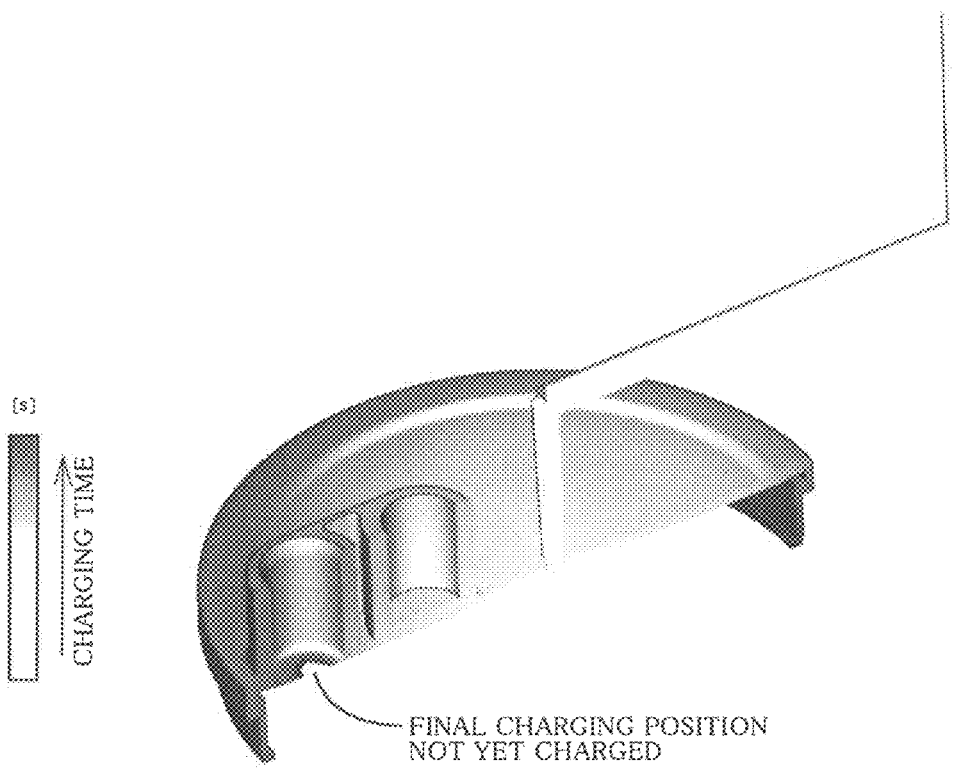
FIG. 7 is a contour diagram showing the charging time distribution of Comparison Example in resin flow analysis.

FIG. 6 is a contour diagram indicating the charging time distribution of Example in the resin flow analysis. FIG. 6 reveals that the separation wall is not at the final charging position in Example. FIG. 7 is a contour diagram indicating the charging time distribution of Comparison Example in the resin flow analysis. FIG. 7 reveals that the separation wall is at the final charging position in Comparison Example.

That is, as shown in the analysis result in Table 1, in Comparison Example in which the gate type was the pin gate, there was a charging end weld in the separation wall.

In contrast to this, in Example in which the gate type was the submarine gate 6 and the gate position was at a position corresponding to the outer peripheral surface 2A of the disc part 2 in the radially outer side of the separation wall 5, there was no charging end weld in the separation wall.

Therefore, as shown in FIG. 4 and FIG. 5, if the gate position of the injection mold die IM is set at the radially outer side of the separation wall 5 that is thinner than other portions, and the gate position is set to be near the separation wall 5, no charging end weld is generated on the separation wall 5. Accordingly, reduction in air tightness of the separation wall 5 and in strength thereof can be prevented in the protective cover 1 having the sensor holder part 4.

TABLE 1

| | | Example/Comparison Example | |
| --- | --- | --- | --- |
| | | Example | Comparison Example |
| Gate type | | Submarine gate (FIG. 2, FIG. 5) | Pin gate |
| Gate position | | Outer peripheral surface 2A of disc part 2 in radially outer side of separation wall 5 (FIG. 2, FIG. 4, FIG. 5) | Inward side at center O of disc part 2 (FIG. 3) |
| Gate diameter | mm | | 2 |
| Injection flow rate | mm³/s | | 70 |
| Thickness of separation wall | mm | | 0.3 |
| Presence/absence of charging end weld on separation wall | | Absent | Present |

Figure 8:
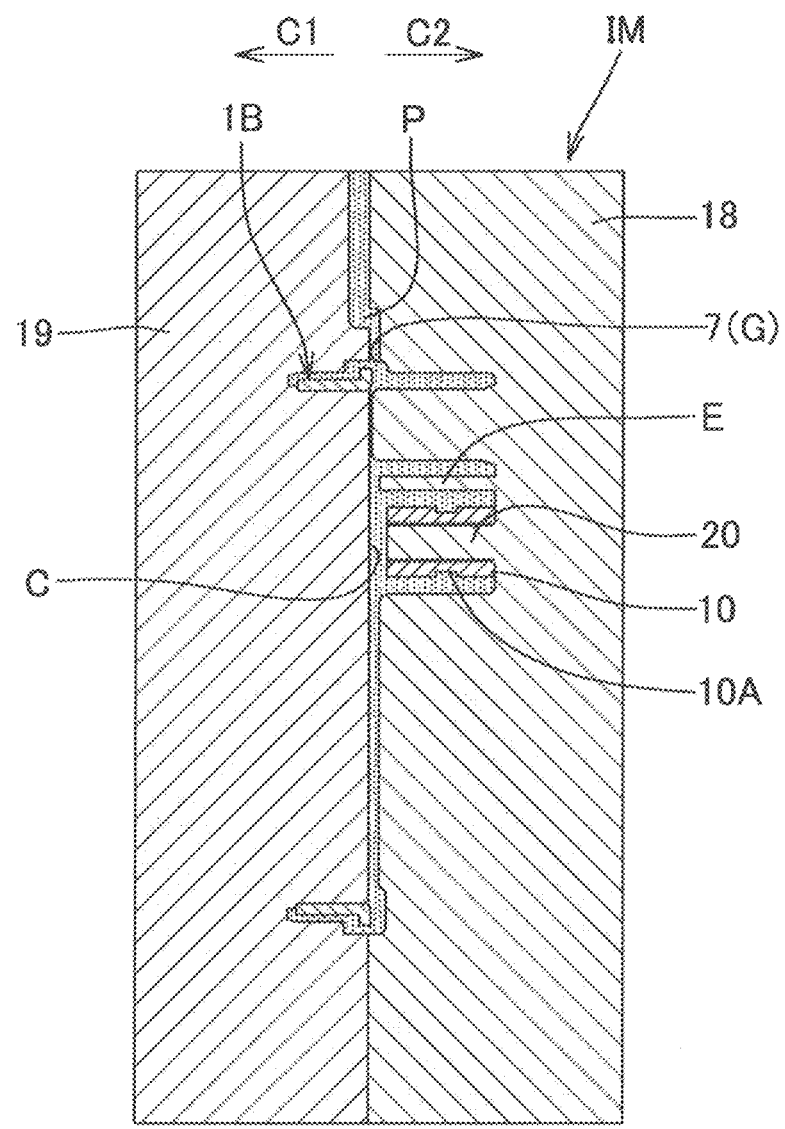
FIG. 8 is a vertical cross-sectional view taken along the arrows 4-4 in FIG. 3, shows an injection mold die for molding the protective cover having the sensor holder part according to the embodiment of the present invention; and also shows a side gate.
Figure 9:
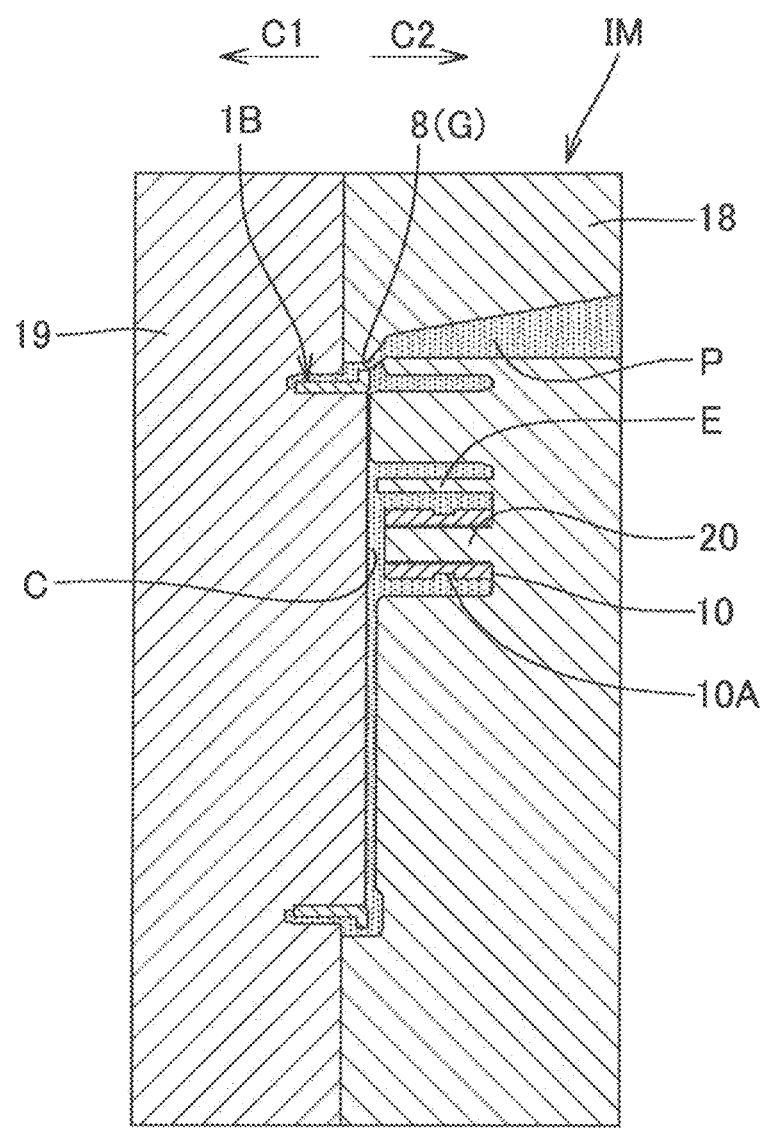
FIG. 9 is the vertical cross-sectional view of the injection mold die, same as the vertical cross-sectional view in FIG. 8, and shows a special pin gate.

The gate type of the injection mold die is not limited to the submarine gate 6, and may be a side gate 7 as shown in a vertical cross-sectional view in FIG. 8, a special pin gate 8 as shown in a vertical cross-sectional view in FIG. 9, or the like.

However, if the submarine gate 6 as shown in the vertical cross-sectional view in FIG. 5 is used, the die structure is simplified than in the case of the special pin gate 8, and there is no need to cut the gate in a later step unlike the case of the side gate 7.

In the method for manufacturing the protective cover as described above, the gate G, of the injection mold die IM, through which the molten synthetic resin material P is injected, is located at a position corresponding to the outer peripheral surface 2A of the disc part 2 or a position corresponding to the outer peripheral surface 3A of the cylindrical part 3 continuous with the disc part 2 in the radially outer side of the separation wall 5. Since the gate G is provided at the radially outer side, of the separation wall 5, which is near the separation wall 5 thinner than other portions, no charging end weld is generated on the separation wall 5 when the molten synthetic resin material P is injected through the gate G into the cavity C of the injection mold die IM and solidified in the injection molding step.

Therefore, in the protective cover 1 that has the sensor holder part 4 and is manufactured by this manufacturing method, reduction in air tightness and strength of the separation wall 5 between the magnetic sensor 9 and the magnetic encoder 16 can be prevented.

In addition, since the protective cover 1 does not have the thick part for preferentially charging the molten synthetic resin material into the thin part forming the separation wall 5, there is no restriction of preventing the thick part from interfering with another component. Thus, the degree of freedom in designing the protective cover 1 can be improved.

The description of the above embodiment is in all aspects illustrative and not restrictive. Various improvements and modifications can be made without departing from the scope of the present invention.

What is claimed is:

1. A protective cover having a sensor holder part, having a cup shape, and configured to be used in a bearing device, the bearing device including:
   a bearing including: an inner ring having, on an outer peripheral surface thereof, an inner ring raceway surface: an outer ring having, on an inner peripheral surface thereof, an outer ring raceway surface; and a rolling element rolling between the inner ring raceway surface and the outer ring raceway surface;
   a magnetic encoder including N poles and S poles, which are alternately arranged at regular intervals in a circumferential direction, the magnetic encoder being located at an inward-side end portion of the bearing and fixed to the inner ring; and
   a magnetic sensor being opposed to magnetic poles of the magnetic encoder, for detecting rotation of the magnetic encoder,
   the protective cover being configured to be mounted to the outer ring so as to seal the inward-side end portion of the bearing,
   the protective cover comprising:
   a disc part that is made of a synthetic resin and has a separation wall formed therein, the separation wall being thinner than other portions of the disc part, and separating the magnetic encoder and the magnetic sensor from each other; and
   the sensor holder part made of the synthetic resin and protruding inward from the disc part,
   the protective cover being molded through injection molding of the synthetic resin, wherein
   a gate mark caused by the injection molding is present on an outer peripheral surface of the disc part or an outer peripheral surface of a cylindrical part continuous with the disc part, in a radially outer side of the separation wall.

2. A bearing device comprising the protective cover having the sensor holder part, according to claim 1.

3. A method for manufacturing, by use of an injection mold die, a protective cover having a sensor holder part, having a cup shape, and configured to be used in a bearing device, the bearing device including:
   a bearing including: an inner ring having, on an outer peripheral surface thereof, an inner ring raceway surface: an outer ring having, on an inner peripheral surface thereof, an outer ring raceway surface; and a rolling element rolling between the inner ring raceway surface and the outer ring raceway surface;
   a magnetic encoder including N poles and S poles, which are alternately arranged at regular intervals in a circumferential direction, the magnetic encoder being located at an inward-side end portion of the bearing and fixed to the inner ring; and
   a magnetic sensor being opposed to magnetic poles of the magnetic encoder, for detecting rotation of the magnetic encoder,
   the protective cover being configured to be mounted to the outer ring so as to seal the inward-side end portion of the bearing,
   the protective cover including:
   a disc part that is made of a synthetic resin and has a separation wall formed therein, the separation wall being thinner than other portions of the disc part, and separating the magnetic encoder and the magnetic sensor from each other; and the sensor holder part made of the synthetic resin and protruding inward from the disc part, the injection mold die being configured to mold the protective cover and including a gate at a position corresponding to an outer peripheral surface of the disc part or a position corresponding to an outer peripheral surface of a cylindrical part continuous with the disc part, in a radially outer side of the separation wall, the method comprising:

closing the injection mold die, injecting a molten synthetic resin material from the gate into a cavity of the die, and solidifying the material, to perform injection molding; and opening the injection mold die and taking out a solidified molded article.

4. The method for manufacturing the protective cover having the sensor holder part, according to claim 3, wherein the gate is a submarine gate.

\* \* \* \* \*